C. MERRITT.
AUTOMATIC FRAME LOCK.
APPLICATION FILED NOV. 1, 1909.
964,997.
Patented July 19, 1910.
2 SHEETS—SHEET 1.
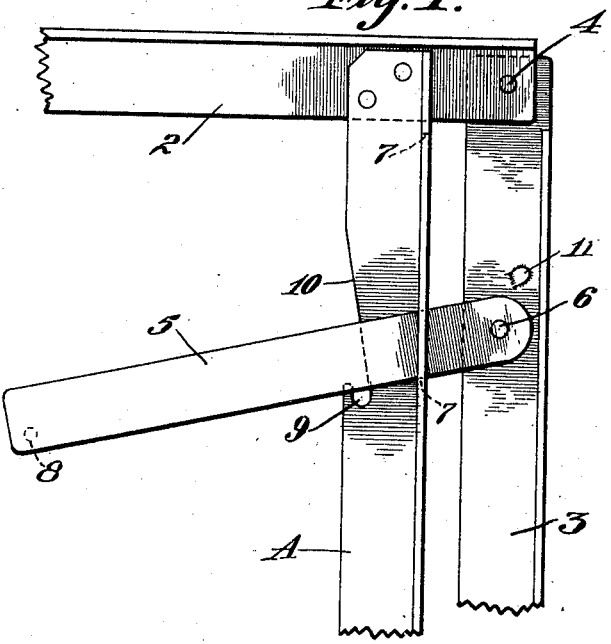
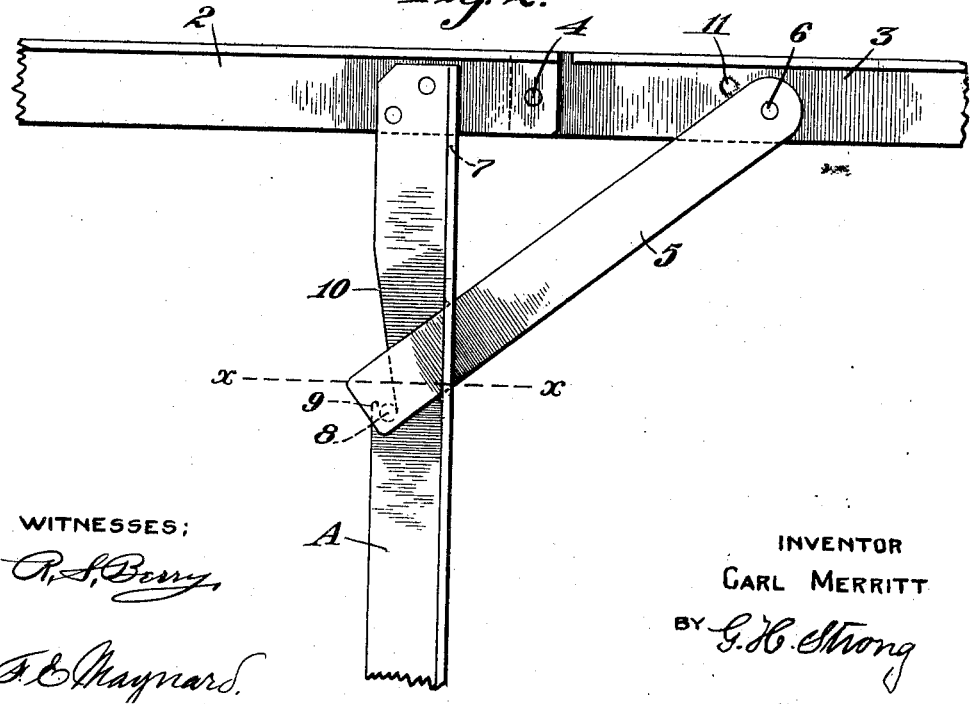
WITNESSES;
INVENTOR
CARL MERRITT
BY G. H. Strong
HIS ATTORNEY

C. MERRITT.
AUTOMATIC FRAME LOCK.
APPLICATION FILED NOV. 1, 1909.

964,997.

Patented July 19, 1910.
2 SHEETS—SHEET 2.

WITNESSES;
R. S. Berry
F. E. Maynard

INVENTOR
CARL MERRITT
BY G. H. Strong
HIS ATTORNEY.

UNITED STATES PATENT OFFICE.

CARL MERRITT, OF SAN FRANCISCO, CALIFORNIA.

AUTOMATIC FRAME-LOCK.

964,997.  Specification of Letters Patent.  Patented July 19, 1910.

Application filed November 1, 1909. Serial No. 525,692.

*To all whom it may concern:*

Be it known that I, CARL MERRITT, a citizen of the United States, residing in the city and county of San Francisco and State of California, have invented new and useful Improvements in Automatic Frame-Locks, of which the following is a specification.

My invention relates to a means for retaining and holding a hinged portion of a frame in an extended position, and for automatically disengaging the lock so as to allow the hinged portion to be folded with relation to the main portion of the frame.

It consists in a combination and arrangement of parts, and in details of construction which will be more fully explained by reference to the accompanying drawings, in which—

Figure 3:
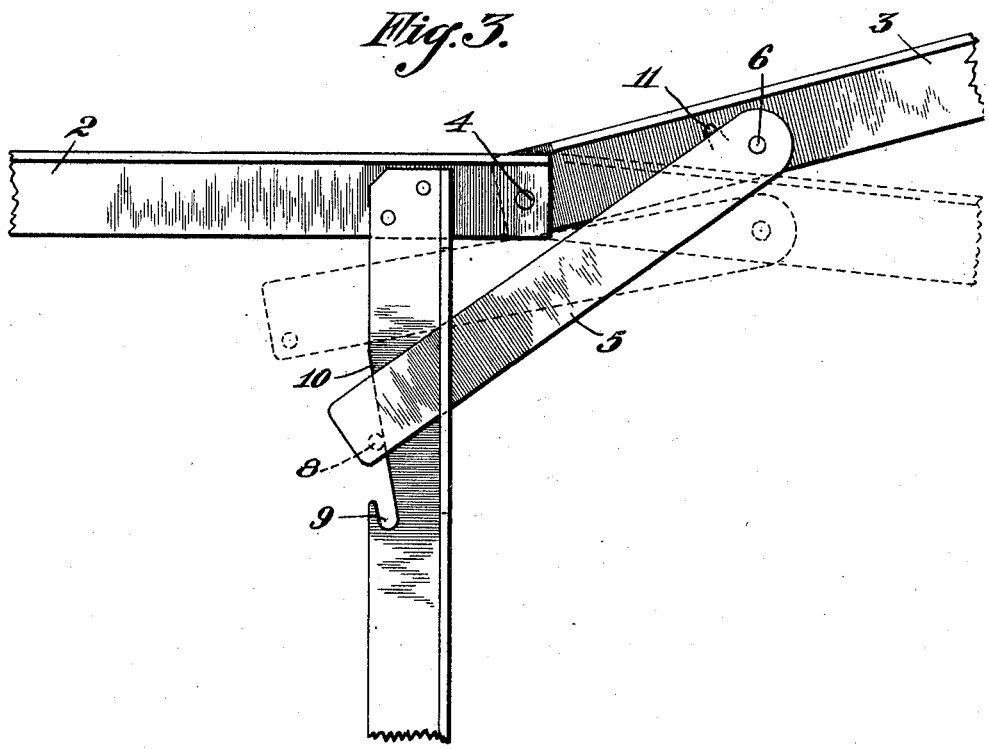
Figure 4:
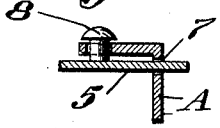

Figure 1 shows the lock disengaged, and the hinged portion in a dependent position. Fig. 2 shows the hinged portion extended and the lock engaged. Fig. 3 shows the hinged portion on the commencement of the downward movement after being raised, and the latch in disengaged position. Fig. 4 is a detail showing in cross section, the vertical standard, and the bar 5, with its pin 8, engaging the notch in the standard.

My invention may be applied to any structure in which it may be desirable to raise a portion which is hinged to the main structure, into a substantially horizontal position, and to disengage such portion so as to allow it to fall into an approximately vertical position. In the present case I have illustrated a sufficient portion of the main fixed structure, and the hinged structure to illustrate my invention.

A is a vertical standard which I have here shown as made of angle iron, and having a similar angle iron bar 2 riveted or otherwise secured to its upper end, and lying in a horizontal position.

3 is an extension pivoted to the part 2 as shown at 4, and capable of turning about this pivot so as to hang dependent in an approximately vertical position, or to be raised about its pivot to a point above the horizontal.

In order to retain the hinged arm or arms of the structure in their horizontal position, I have shown a bar 5 pivoted to the swinging portion 3, as shown at 6.

The vertical bar A is slotted or channeled as shown at 7 so as to form a guide through which the bar 5 is guided and slidable. In the end of the bar opposite to the pivot is fixed a pin or lug 8.

That portion of the vertical angle bar A which is at right angles with its slotted portion, and which is parallel with the plane of the bar, has a notch formed in it, as shown at 9, into which notch the pin 8 may drop when the hinge member 3 has been raised to its desired horizontal position; the bar thus automatically locks and holds the hinged member in its raised position. In order to disengage this lock or latch, the edge of the standard or member A in which the notch is formed, is cut away, so that it forms an incline 10 from the inner edge of the notch 9, said incline merging at the top with the vertical portion of this part of the standard A. When the latch is to be disengaged the outer end or edge of the hinged leaf member 3 is raised. This causes the pin 8 to leave the notch 9, and to follow up the inclined edge 10 until it is in vertical line outside of the vertical line of the notch. The leaf being then dropped with some rapidity, the inertia of the bar causes it to drop so that the pin moves downward in approximately a vertical line with its position when the drop commences, and this carries it outside of the notch, and allows the bar to drop upon the lower edge of the guide channel or slot through which it passes, the hinged leaf or member being thus allowed to drop into an approximately vertical hanging position.

In order to insure the disengagement of the pin 8 from the notch when the leaf is lifted, I have shown a device having sufficient frictional adhesion to prevent the bar 5 from dropping freely after the leaf has been raised. Such a frictional device may consist of an elastic washer surrounding the pivot pin 6, or I may indent the bar, or a portion of the angle iron leaf which is contiguous to the bar so that a slightly raised portion, 11, is formed, and this raised portion provides a certain amount of friction which will, in a measure, prevent the link bar 5 from dropping quickly when the leaf 3 is moved downward after having been raised above its horizontal position. The position of the parts under these conditions, is well shown in Fig. 3; the frictional contact in a measure holding the bar in the position to which it was brought by the raising of the hinged leaf, and it is thus carried beyond the vertical line of the notch so that it is not even necessary to drop the leaf rapidly. To overcome this frictional action, and insure the link taking the position which will allow it to again engage the notch 9, it will be seen that as the leaf is dropped into its dependent position, the upper edge of the link will slide along the upper edge of its guiding slot, and the link will thus be turned about its pivot and overcome any frictional tendency of the holding device 11 so that when the leaf is in its dependent position, the link will be in such position that it will again engage the notch when the leaf is lifted.

I have here described a single section of the device illustrating my invention, it will be manifest that when used, for instance, for a couch frame that there may be two of these members, one at each end, and the hinged leaf may form an extension from the main fixed portion of the couch, and this leaf will be held in its horizontal position by latches similar to that herein described at each end, and these latches may be simultaneously disengaged by the lifting of the leaf above the horizontal, and then allowing it to drop into its vertical dependent position. The same latch mechanism is applicable to any form of frame where a movement of a hinged portion with relation to a fixed portion and similar to that herein described, is desired.

Having thus described my invention, what I claim and desire to secure by Letters Patent is—

The combination with a vertical bar having a slot in one portion and having one edge portion provided with an upwardly presented notch, the edge of the bar being inclined to connect with the inner wall of the notch; of a hinged swinging member, a bar slidable with relation to the vertical bar and passing through the slot thereof, the free end of the slidable bar having a pin adapted to engage the notch in said vertical bar to retain the swinging member in an elevated position, said pin adapted to slide upwardly against the incline on the edge of the vertical bar when the hinged member is raised above its normal position whereby the pin will be projected clear of the notch when the hinged member is suddenly dropped.

In testimony whereof I have hereunto set my hand in the presence of two subscribing witnesses.

CARL MERRITT.

Witnesses:
A. K. DAGGETT,
GEO. H. STRONG.